US012631488B2

(12) United States Patent
Geske et al.

(10) Patent No.: US 12,631,488 B2
(45) Date of Patent: May 19, 2026

(54) WIDE WAVELENGTH OPTICAL DETECTION SYSTEM

(71) Applicant: Attollo Engineering, LLC, Camarillo, CA (US)

(72) Inventors: Jonathan Geske, Ventura, CA (US); Timothy A. Strand, Santa Barbara, CA (US)

(73) Assignee: Attollo Engineering, LLC, Camarillo, CA (US)

( * ) Notice: Subject to any disclaimer, the term of this patent is extended or adjusted under 35 U.S.C. 154(b) by 169 days.

(21) Appl. No.: 18/544,860

(22) Filed: Dec. 19, 2023

(65) Prior Publication Data

US 2024/0219234 A1      Jul. 4, 2024

Related U.S. Application Data

(60) Provisional application No. 63/435,786, filed on Dec. 28, 2022.

(51) Int. Cl.
*G01J 3/18*        (2006.01)
*G01J 3/28*        (2006.01)
(52) U.S. Cl.
CPC ............... *G01J 3/18* (2013.01); *G01J 3/2803* (2013.01)

(58) Field of Classification Search
CPC ........ G01J 3/18; G01J 3/2803; G02B 5/1819; G02B 5/1823; G02B 27/4233; G02B 27/4244; G02B 27/4277
See application file for complete search history.

(56) References Cited

U.S. PATENT DOCUMENTS

| | | | |
|---|---|---|---|
| 2002/0101587 A1 | 8/2002 | Wilson et al. | |
| 2006/0274308 A1 | 12/2006 | Brady et al. | |
| 2009/0185274 A1* | 7/2009 | Shpunt | G02B 27/4233 |
| | | | 359/558 |
| 2017/0295327 A1 | 10/2017 | Menon | |
| 2022/0221733 A1 | 7/2022 | Saari et al. | |

OTHER PUBLICATIONS

"Extended European Search Report Received for Application No. 23219338.3 mailed on Jun. 7, 2024", 11 Pages.

* cited by examiner

*Primary Examiner* — Kevin K Pyo
(74) *Attorney, Agent, or Firm* — Billion & Armitage

(57) ABSTRACT

An optical detection system includes a diffractive optical element (DOE) configured to receive incident light and a detector. The DOE causes incident light at a first wavelength to generate a first diffraction pattern and incident light at a second wavelength different than the first wavelength to generate a second diffraction pattern distinguishable from the first diffraction pattern, wherein the detector detects light diffracted by the DOE.

19 Claims, 11 Drawing Sheets

304

First and second wavebands (310a, 310b)

306

308 y x

Diffraction patterns (312a, 312b)

Diffraction pattern (312a)

Diffraction pattern (312b)

Diffraction patterns
(312a, 312b)

404

406

408

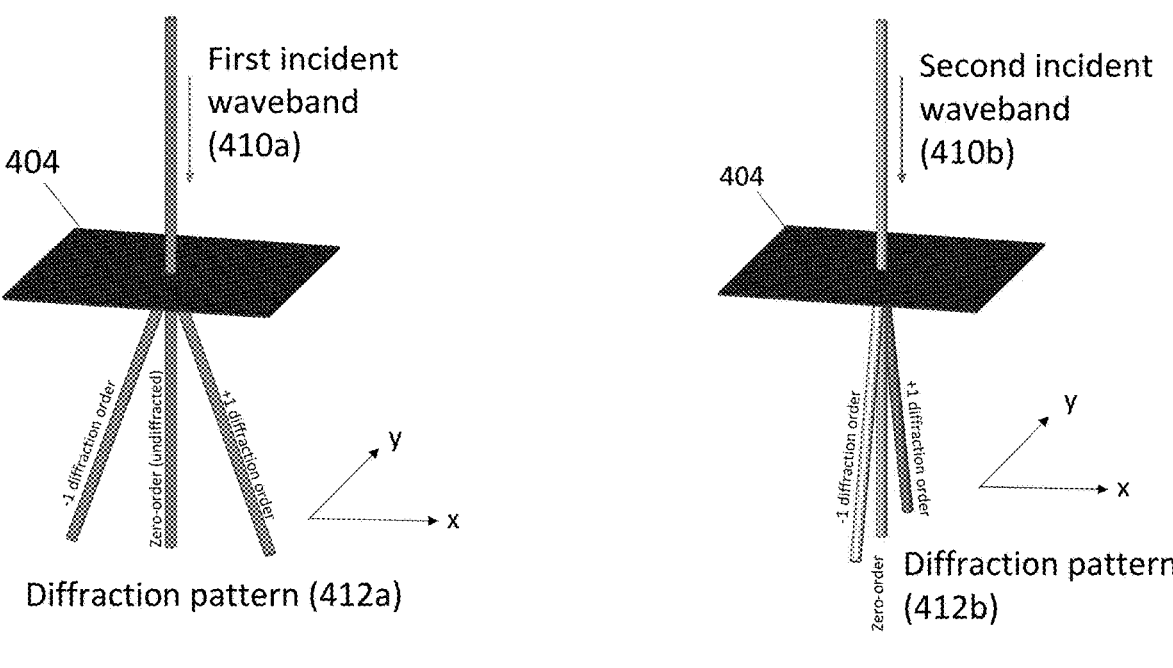
FIG. 5A
FIG. 5B
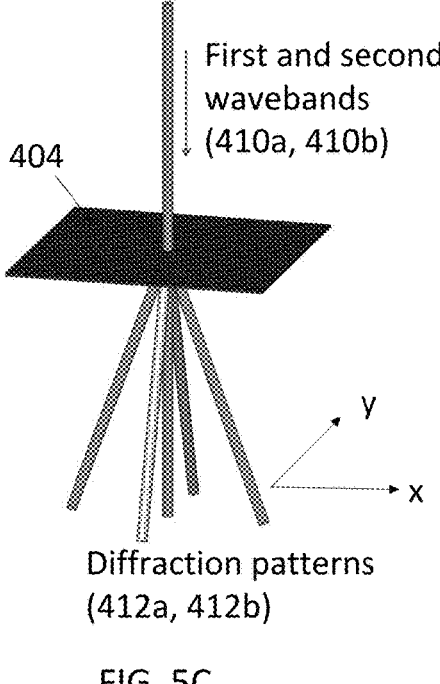
FIG. 5C

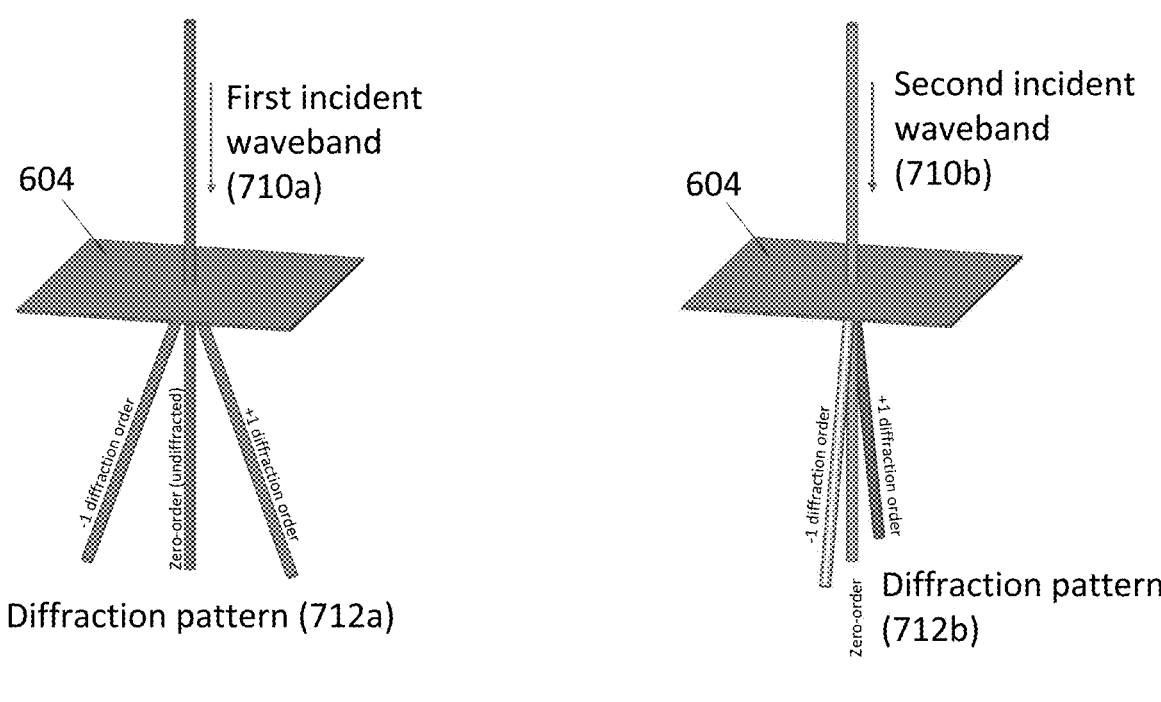
FIG. 7A                            FIG. 7B
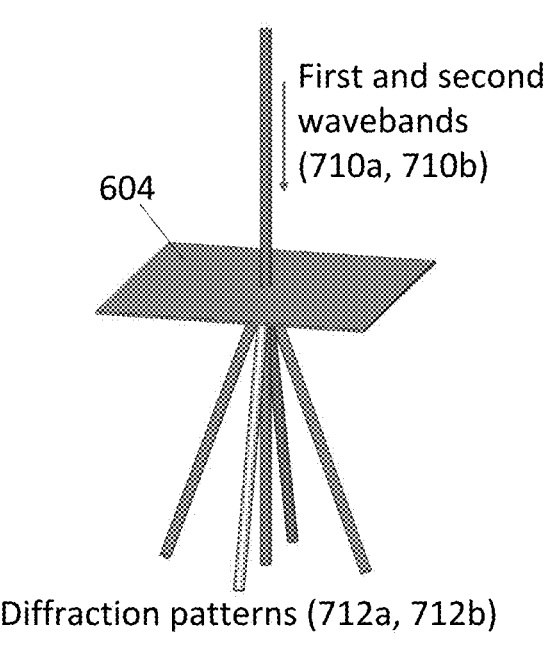
FIG. 7C

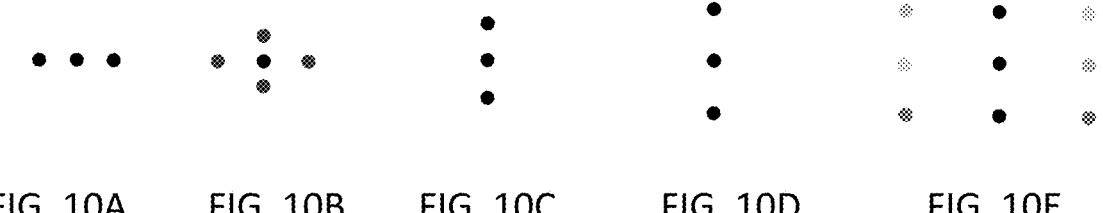
FIG. 10A       FIG. 10B       FIG. 10C       FIG. 10D       FIG. 10E
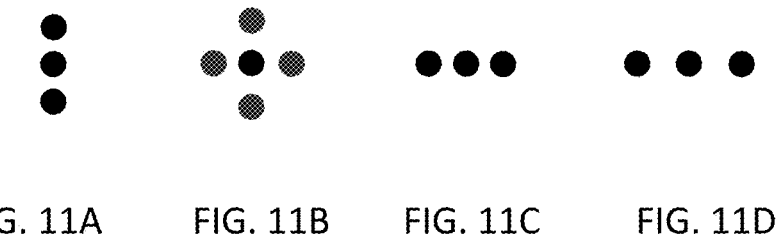
FIG. 11A       FIG. 11B       FIG. 11C       FIG. 11D
FIG. 12A                                    FIG. 12B

WIDE WAVELENGTH OPTICAL DETECTION SYSTEM

CROSS-REFERENCE TO RELATED APPLICATIONS

This application claims benefit of priority to U.S. Provisional Patent Application No. 63/435,786, filed on Dec. 28, 2022, the entire disclosure of each of which is hereby incorporated by reference.

BACKGROUND

Optical detection systems are utilized to detect and differentiate laser light from non-laser sources. For example, optical detection systems may utilize a diffractive optical element (i.e., grating) to generate a diffraction pattern in response to a certain wavelength of laser light. Laser energy has the properties that it is generally of a single electromagnetic frequency or a narrow bandwidth of electromagnetic frequencies. An optical detection system can capitalize on the nearly monochromatic nature of the laser to be detected and use the monochromaticity as a feature upon which to differentiate the photons of the laser from other types of photons (e.g., photons emitted from light-emitting diodes, incandescent lights, the sun, etc.) that may be collected and detected by the system. In particular, an optical device referred to as a "grating" refers to devices that utilize the wavelength of light as the primary attribute upon which they act. In optics, gratings such as line-ruled gratings and engineered diffractive optical elements have wavelength dependent performance that is dictated by the grating equation:

$$m\lambda = d(\sin\alpha + \sin\beta) \qquad \text{Eq. 1}$$

wherein $\lambda$ refers to the wavelength of the incident light, d is the pitch of the grating, $\alpha$ is the angle of incidence of the incoming light, and $\beta$ is the angle of the diffracted light (as shown in FIG. 13). The grating equation illustrates that sine of the diffraction angle of the orders of the grating is proportional to the photon wavelength impinging upon the grating. If the light impinging on the grating is substantially of a single wavelength, then the grating will direct the light into a countably few sets of angles depending on the equation and the other design parameters of the grating (such as the pitch of the grating). If the grating is a simple ruled grating or triangular grating as shown in FIG. 13, then the propagated light will be directed into all the diffraction orders available for a particular wavelength $\lambda$ (all values of m for which $Im\lambda/dI<2$ correspond to propagating (rather than evanescent) diffraction orders). The intensity profile of each of the propagated orders is dictated by other design equations relevant to ruled gratings.

For applications in which detection of a wide range of wavelengths are required, multiple optical detection systems may be required, each optical detection system utilizing a separate grating tuned to operate on a different sub-set of wavelengths. It would be beneficial to develop an optical or laser detection system capable of detecting a wide range of wavelengths without requiring a plurality of optical paths or a plurality of separate optical detection systems.

SUMMARY

According to one aspect, an optical detection system includes a diffractive optical element (DOE) configured to receive incident light and a detector. The DOE causes incident light at a first wavelength to generate a first diffraction pattern and incident light at a second wavelength different than the first wavelength to generate a second diffraction pattern distinguishable from the first diffraction pattern, wherein the detector detects light diffracted by the DOE.

According to another aspect, a method of detecting and distinguishing light over a wide range of wavelengths includes receiving incident light at a diffractive optical element (DOE) that diffracts the incident light, wherein incident light at a first wavelength interacts with the DOE to generate a first diffraction pattern and incident light at a second wavelength interacts with the DOE to generate a second diffraction pattern distinguishable from the first diffraction pattern. The method further includes detecting at a focal plane array (FPA) light diffracted by the DOE.

BRIEF DESCRIPTION OF THE DRAWINGS

FIGS. 5A-5C are diagrams illustrating first and second wavelengths of light incident on a tiled DOE and the resulting diffraction patterns generated in response to the first and second wavelengths of light according to some embodiments.

FIGS. 7A-7C are diagrams illustrating first and second wavelengths of light incident on an etched DOE and the resulting diffraction patterns generated in response to first and second wavelengths of light according to some embodiments.

FIGS. 10A-10E illustrate a plurality of diffraction patterns generated by collimated lasers of various wavelengths of light according to some embodiments.

FIGS. 11A-11D illustrate a plurality of diffraction patterns generated by uncollimated lasers of various wavelengths of light according to some embodiments.

FIGS. 12A and 12B are diffraction patterns of unsaturated and saturated collimated broadband energy collected according to some embodiments.

DETAILED DESCRIPTION

The present disclosure describes an optical detection system that can detect and differentiate laser light from other light sources over a wide range of wavelengths. In particular, the disclosure describes a diffractive optical element (DOE) designed to produce non-interfering patterns across the wide range of wavelengths (i.e., the optical bandwidth of the system). That is, incident light at a first wavelength (or range of wavelengths) interacts with the DOE to generate a first diffraction pattern and incident light at a second wavelength (or range of wavelengths) to generate a second diffraction pattern distinguishable from the first. In other embodiments, incident light at additional wavelengths interacts with the DOE to generate additional diffraction patterns distinguishable from the first and second diffraction patterns. As a result, the optical system is able to detect and distinguish laser light from other light sources over a wide range of wavelengths.

Diffractive optical elements (DOEs) may be constructed in a number of different ways, as described herein, including multiple cascaded grating elements, a single element that has multiple grating designs physically patterned into different intermixed sections of the element, and a single element that has multiple functions mathematically combined and then patterned into the element.

The term "orthogonal" is used herein to mean that the non-zero diffraction orders produce differing beam propagation vectors such that the vectors are non-parallel and hence non-overlapping for both the intended design wavelength range and the degenerate condition outside the intended wavelength range. As a result, when focused onto a focal plane array the diffraction spot patterns produced by different grating optimizations will not overlap.

Figure 1:
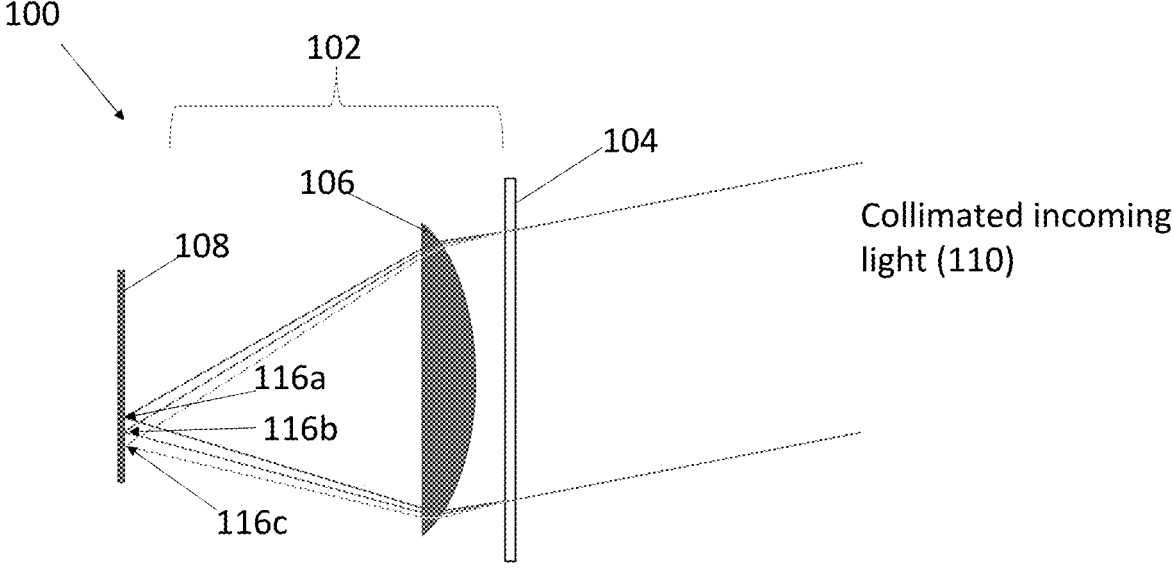
FIG. 1 is a diagram of a narrow field of view (FOV) optical detection system that utilizes a diffractive optical element (DOE) according to some embodiments.

FIG. 1 is a diagram of a narrow field of view (FOV) optical detection system 100 that utilizes a diffractive optical element (DOE) 104 according to some embodiments. The optical detection system 100 includes a lens system 102 and a focal plane array (FPA) 108. The lens system 102 includes the diffractive optical element 104 and a lens 106. The diffracted light provided by diffractive optical element 104 is provided to lens 106, which focuses the diffracted light onto the FPA 108. In some embodiments, the FPA 108 is an optical collection sensor (e.g., detector). In some embodiments, the FPA 108 is a short wavelength infrared (SWIR) camera. More particularly, in some embodiments the FPA 108 is an Indium-Gallium-Arsenide (InGaAs) sensor having sensitivity selected based on the desired wavelengths to be detected and distinguished (e.g., 400-1700 nm).

A typical grating or diffractive element is designed for a particular wavelength of light and will not produce a distinguishable pattern for wavelengths extending outside of the designed wavelength (or range of wavelengths). According to some embodiments, the DOE 104 is designed to diffract light into multiple distinguishable patterns. The diffractive pattern generated on FPA 108 allows the optical detection system 100 to detect and distinguish different wavelengths of light. For example, the DOE 104 may be configured to generate a first diffractive pattern in response to incoming laser light within a first wavelength range and a second, orthogonal or non-overlapping diffractive pattern in response to incoming laser light within a second wavelength range. In this way, the optical detection system 100 is able to detect and distinguish laser light over a wide range of wavelengths (i.e., wide wavelength detection). Distinguishing between lasers of different wavelengths requires that DOE 104 diffract light into patterns that are not interfering (orthogonal) with one another. In some embodiments, the DOE 104 is configured to generate linear spot patterns that rely on a 90-degree axis separation between the two different diffraction patterns (such as horizontal or vertical). If more than two diffraction patterns are required based on the desired span on wavelengths to be detected, then the diffraction patterns may be separated by small angles (e.g., 45 degree angle between the respective diffraction patterns).

In some embodiments, the diffraction pattern includes +1/−1 diffraction patterns and a zero order diffraction pattern (shown for example in FIGS. 3A-3C, 5A-5C, and 7A-7C). The zero order represents un-diffracted light and can be utilized to determine an angle of incidence of light incident on the optical detection system 100. In this way, the diffraction pattern (including the +1/−1, 0 orders) incident on the FPA 108 can be utilized to determine the angle of incidence, the wavelength (based on the diffraction pattern detected), and the degree of coherence (e.g., linewidth) of the light incident on the optical detection system 100.

Figure 2:
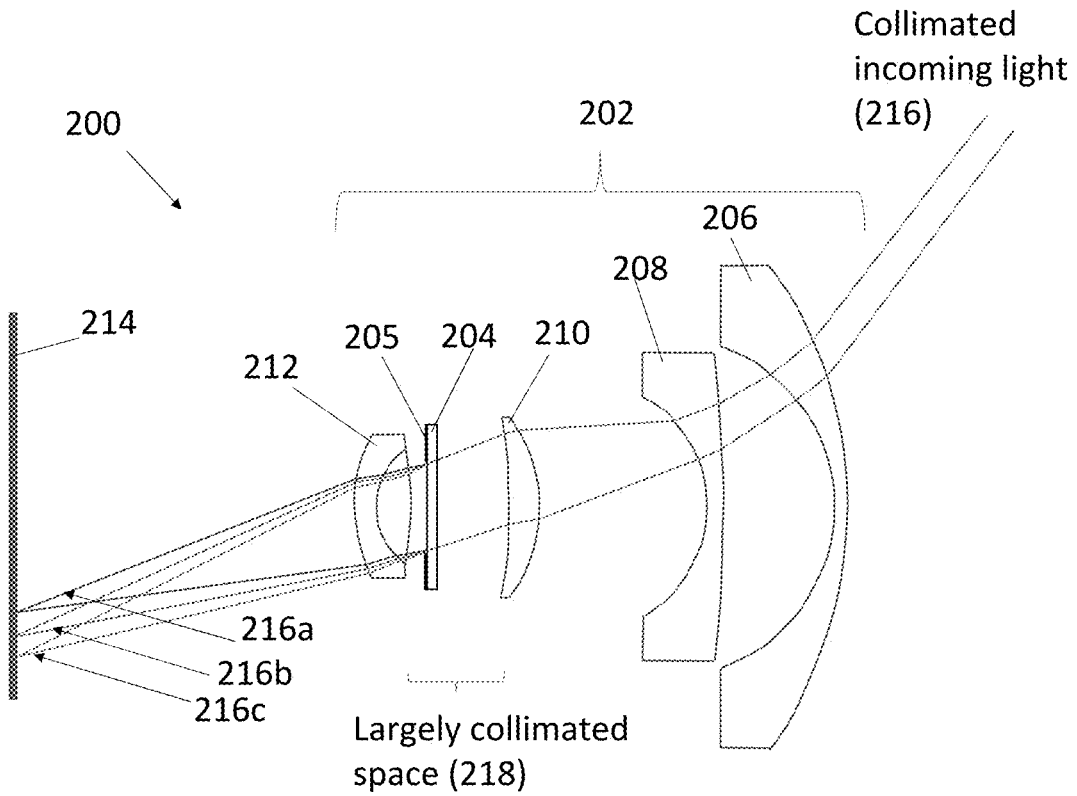
FIG. 2 is a diagram of a wide FOV optical detection system that utilizes a DOE according some embodiments.

FIG. 2 is a diagram of a wide FOV optical detection system 200 that utilizes a DOE 204 according some embodiments. The wide FOV optical detection system 200 includes a fisheye lens system 202, which includes first and second fisheye lenses 206 and 208, third lens 210, DOE 204, pupil 205, and fourth lens 212 for focusing the light onto the focal plane array 214. As illustrated by the ray tracing of collimated incident light 216, first and second lens 206 and 208 are configured to collect light from a wide FOV, but light refracted by the second lens 208 is uncollimated. The DOE 204 operates best on collimated light, and therefore the third lens 210 is configured to provide largely collimated light to the DOE 204. As described with respect to FIG. 1, the DOE 204 generates diffraction patterns detected by the FPA 214 (i.e., image sensor).

The wide FOV optical detection system 200 shown in FIG. 2 operates in much the same manner as the narrow FOV optical detection system 100 shown in FIG. 1. The main difference between the respective embodiments is the additional lens 210 required between the DOE 204 and the fisheye lenses 206 and 208 to ensure that the light incident on the DOE 204 is largely collimated and at a low angle of incidence as indicated by region 218. As described with respect to FIG. 1, the diffraction pattern includes +1/−1 diffraction patterns and a zero order diffraction pattern (shown for example in FIGS. 3A-3C, 5A-5C, and 7A-7C). The zero order represents un-diffracted light and can be utilized to determine an angle of incidence of light incident on the optical detection system 100. In this way, the diffraction pattern (including the +1/−1, 0 orders) incident on the FPA 208 can be utilized to determine the angle of incidence, the wavelength (based on the diffraction pattern detected), and the linewidth of the light (detected based on the shape of the dots making up the diffraction pattern) incident on the optical detection system 100.

In some embodiments, the placement of the DOE 104, 204 within the optical train is selected to reduce the angles of light interacting with the DOE to achieve a well-controlled balance between the diffraction orders that will match the design ideals for the grating. In general, wider angles require compromises in the design including shifting the design wavelength to shorter wavelengths. It also requires adjustment of the structure etch and design. These compromises reduce the overall efficiency of the grating and complicate the design of the processing of the grating. In some embodiments, the maximum angle is restricted to 25 degrees across the system FOV for the exit angle from material of the DOE 104, 204 (e.g. glass) to air. In some embodiments, the DOE 104, 204 is installed with the light passing into the planar side first, passing through the glass, and then hitting the engineered diffraction pattern and exiting into the air. The exit angle is kept below 25 degrees and little impact on grating performance results. The light is also in the largely collimated space so that it can be correctly analyzed as a plane wave to ensure that the grating performance achieved is very close if not identical to the design model used for the grating. The change in incident angle changes the effective depth (optical path length) of the structure that the light sees. The path is proportional to 1/cos(angle) so for example cone angle of $\pm 2.5°$, this represents an effective depth variation across the beam of <0.1%. This will not affect performance of a typical grating or DOE.

In some embodiments, the pupil 205 is positioned adjacent to the DOE 204 as shown in FIG. 2. A benefit of placing the pupil 205 adjacent to the DOE 204 is that the diffracted beams provide a proportional lateral shift at the FPA 214. In other embodiments, the pupil 205 may be placed at other locations within the optical train relative to the DOE 204. In some embodiments, the pupil 205 is located on the incoming side of the DOE 204. In other embodiments, the pupil 205 is located on the opposite side of the DOE 204, receiving light diffracted by the DOE 204 (as shown, in example, in FIG. 2).

Figure 3A:
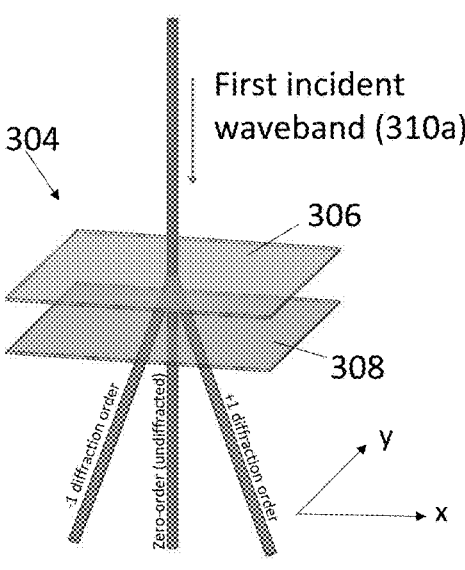
FIGS. 3A-3C are diagrams illustrating first and second wavelengths of light incident on a stacked DOE and the resulting diffraction patterns generated in response to the first and second wavelengths of light according to some embodiments.
Figure 3B:
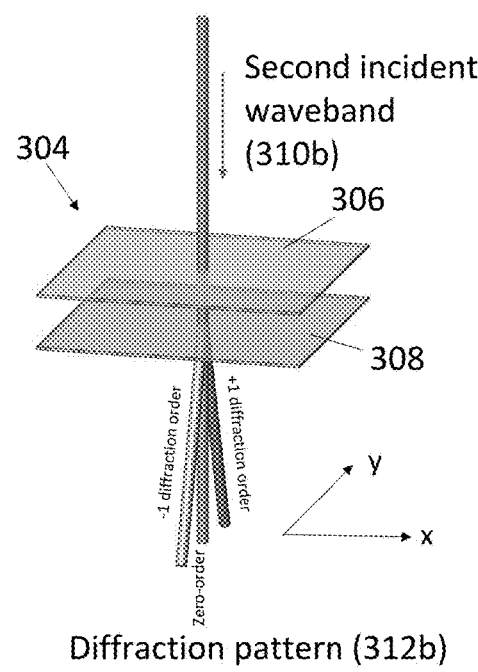
Figure 3C:
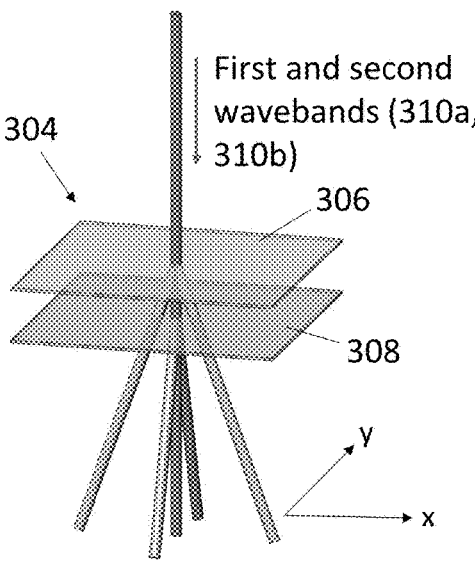

FIGS. 3A-3C are diagrams illustrating first and second wavelengths of light incident on a stacked DOE and the resulting diffraction patterns generated in response to the first and second wavelengths of light according to some embodiments. In the embodiment shown in FIGS. 3A-3C, the DOE 304 includes a first diffractive grating 306 and a second diffractive grating 308. The first diffractive grating 306 is designed to generate a first diffraction pattern 312a in response to incident light within a first range of wavelengths or waveband 310a. The second diffractive grating 308 is designed to generate a second diffraction pattern 312b in response to incident light within a second range of wavelengths or waveband 310b. In the embodiment shown in FIGS. 3A-3C, the first and second diffractive gratings 306 and 308 are stacked on top of one another in what is referred to as a stacked configuration.

FIG. 3A illustrates the interaction between the first diffractive grating 306 and incident light within the first waveband 310a. The first diffractive grating 306 interacts with the incident light and generates a first diffraction pattern (−1 diffraction order, +1 diffraction order) along the x-axis. As illustrated in FIG. 3B, the second diffractive grating 308 interacts with the incident light and generates a second diffraction pattern (−1 diffraction order, +1 diffraction order) that is non-overlapping with first diffraction pattern and extends along the y-axis. FIG. 3C illustrates the resulting diffraction pattern generated by the first and second diffractive gratings 306, 308 in response to incident light in both the first and second wavebands 310a, 310b.

For example, in one embodiment the range of wavelengths to be detected may extend from 400 nm to 1700 nm. A single diffractive grating is not able detect and distinguish incident light along this wide of a range of a wavelengths. In some embodiments, this range of wavelengths can be detected and distinguished by utilizing a first diffractive grating 306 optimized for approximately 532 nm and second diffractive grating 308 optimized for approximately 1064 nm in a stacked configuration such as that shown in FIGS.

3A-3C. The first diffractive grating 306 optimized for 532 nm generates detectable diffraction patterns for wavelengths from 400 nm to 800 nm and the second diffractive grating 308 optimized for 1064 nm generates detectable diffraction patterns for wavelengths from 800 nm to 1700 nm. Their performance overlaps slightly in the center near 800 nm. Furthermore, the functions of the respective diffractive gratings 306 and 308 (i.e., the pattern that they are designed to project light into) must not interfere or overlap substantially in angular space which translates to position on the FPA. For example, the 532 nm grating (i.e., first grating 306) may diffract light in the horizontal direction (i.e., x-axis) and the 1064 nm optimized grating (i.e., the second grating 308) can diffract light in the vertical direction (i.e., y-axis). As a result, when the function of the first grating 306 deteriorates (in response to the incident wavelengths extending out of the range from the 532 nm optimized grating) and the mode order control for said grating is lost, the image sensor located at the FPA collects good data from pixels in the orthogonal axis where light is being diffracted in a desirable manner by the second grating function. The number of optical grating designs needed is based on the wavelength span needing coverage and the optimal wavelength span that a grating design can cover before its performance degrades. In some embodiments, if more than two gratings are required to cover the wavelength span of incoming light, additional gratings may be provided that generate diffraction patterns separated from the first and second diffraction patterns by some angle (e.g., a third diffraction pattern may be separated from both the first and second diffraction patterns by 45 degrees).

The stacked DOE configuration 304 illustrated in FIGS. 3A-3C may be utilized in either the narrow FOV optical detection system 100 shown in FIG. 1, wherein the DOE 104 would include the stacked DOE 304 or the wide FOV optical detection system 200 shown in FIG. 2, wherein the DOE 204 would include the stacked DOE 304. In both cases, the DOE 104 or 204 would include a first and second grating 306, 308 oriented in a stacked configuration to operate on incident light.

Figure 4:
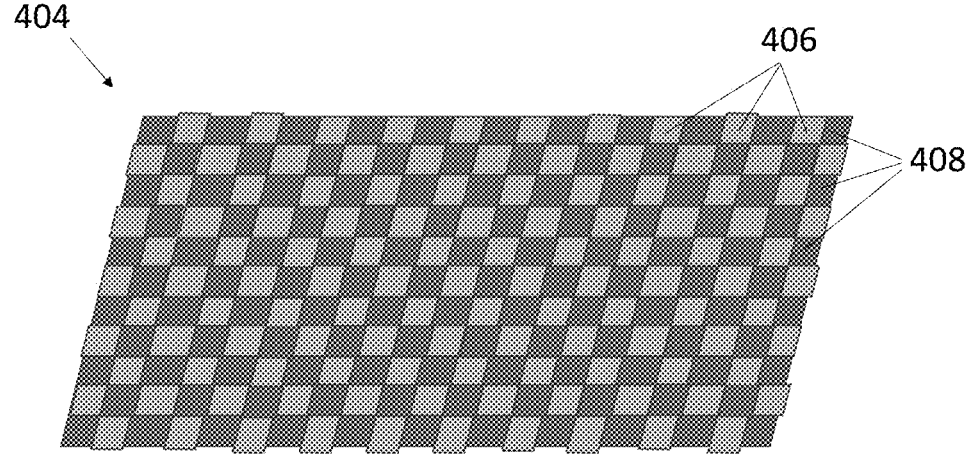
FIG. 4 is a diagram of a tiled DOE according to some embodiments.

FIG. 4 is a diagram of a tiled DOE 404 according to some embodiments. As shown in FIG. 4, the DOE 404 is comprised of a plurality of individual tiles 406, 408 arranged in a checkered or tiled configuration. FIGS. 5A-5C are diagrams illustrating first and second wavelengths of light incident on the tiled DOE 404 and the resulting diffraction patterns generated in response to the first and second wavelengths of light according to some embodiments.

As shown in FIG. 4, the tiled DOE 404 includes a plurality of tiles 406 having a first grating pattern optimized for a first wavelength or waveband and a plurality of tiles 408 having a second grating pattern optimized for a second wavelength or waveband. In the embodiment shown in FIG. 4, the plurality of tiles 406 and the plurality of tiles 408 are oriented in a checkered configuration, but other orientations may be utilized. In some embodiments, the size of the tiles is selected such that the incident light illuminates a multitude of tiles. The functions associated with the plurality of tiles 406 and 408 can be defined as two different grating designs that are separated into "islands" that are intermixed on the surface of a single optical element. In the embodiment shown in FIG. 4, the grating functions are separated laterally with respect to the optical axis of the system. The light then hits both DOE patterns simultaneously. In some embodiments, the size of the individual tiles 406 and 408 are equal to one another, but with a size selected such that a plurality of tiles are illuminated by a beam of incident light. In some embodiments, the size of the tiles 406 and 408 may be unequal. Likewise, in some embodiments the total surface area presented by the plurality of tiles 406 is equal to the total surface area presented by the plurality of tiles 408. In other embodiments, the total surface area presented by the plurality of tiles 406 is unequal to the total surface area presented by the plurality of tiles 408.

As shown in FIG. 5A-5C, the tiled DOE 404 operates to generate orthogonal or non-overlapping diffraction patterns 412a, 412b in response to incident light in the first waveband 410a and the second waveband 410b, respectively. FIG. 5A illustrates the interaction between the tiled diffractive grating 404 and incident light within the first waveband 410a. The first plurality of tiles 406 included in the tiled diffractive grating 404 interact with the incident light and generate a first diffraction pattern 412a (−1 diffraction order, +1 diffraction order) along the x-axis. As illustrated in FIG. 5B, the second plurality of tiles 408 included in the tiled diffractive grating 404 interact with the incident light and generate a second diffraction pattern 412b (−1 diffraction order. +1 diffraction order) that is non-overlapping with first diffraction pattern and extends along the y-axis. FIG. 5C illustrates the resulting diffraction pattern generated by the tiled diffractive grating 404 in response to incident light in both the first and second wavebands 410a, 410b.

The tiled DOE configuration 404 illustrated in FIGS. 4 and 5A-5C may be utilized in either the narrow FOV optical detection system 100 shown in FIG. 1, wherein the DOE 104 would include the tiled DOE 404 or the wide FOV optical detection system 200 shown in FIG. 2. A benefit of the tiled DOE 404 as compared with the stacked DOE 304 is that the tiled DOE 404 does not require first and second gratings in a stacked configuration. Rather, the tiled DOE 404 tiles first and second gratings (406, 408) within a single plane. As a result, light incident on the tiled DOE 404 does not need to pass through a second layer or level of gating.

Figure 6:
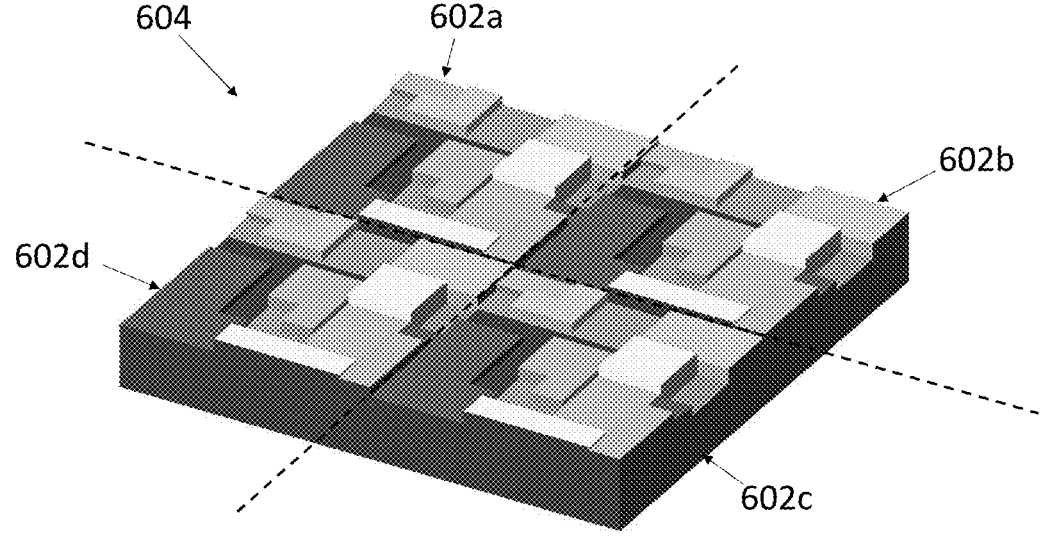
FIG. 6 is an isometric view of an etched DOE comprised of multi-binary levels approximating a continuous grating according to some embodiments.

FIG. 6 is an isometric view of a continuous DOE 604 comprised of multi-binary levels approximating a continuous grating according to some embodiments. The embodiment shown in FIG. 6 is a magnified view that illustrates a 2×2 array of identical cells 602a, 602b, 602c, and 602d that repeat along the surface of the etched DOE 604. Each cell is comprised of a plurality of multi-binary levels that approximate a continuous grating. In some embodiments, the multi-binary levels are designed as a result of a computed superposition of orthogonal grating elements optimized for desired wavelengths or wavebands. That is, assuming two desired optimization functions related to two selected wavelengths or wavebands, the continuous grating function is designed by simultaneously solving for the Fourier transform of the two or more desired grating functions at the same time to generate a single pattern that has both grating functions configured to operate at different optimized wavelengths and with orthogonal diffraction orders and focused patterns. In some embodiments, the solutions are solved simultaneously and processed into a grating function to act as one design but with different wavelength optimizations with each optimization in a non-overlapping direction (orthogonal optimizations). Such an approach eliminates the diversion of energy into undesirable grating orders including in some embodiments the 0-order.

As shown in FIGS. 7A-7C, the continuous or etched DOE 604 operates to generate orthogonal or non-overlapping diffraction patterns 712a. 712b in response to incident light in the first waveband 710a and the second waveband 710b, respectively. FIG. 7A illustrates the interaction between the etched DOE 604 and incident light within the first waveband

710a. The continuous grating interacts with the incident light and generates a first diffraction pattern 712a (−1 diffraction order, +1 diffraction order) along the x-axis in response to the wavelength of the first waveband 710a. As illustrated in FIG. 7B, the continuous grating also interacts with the incident light in the second waveband 710b to generate a second diffraction pattern 712b (−1 diffraction order, +1 diffraction order) that is non-overlapping with first diffraction pattern 712a and extends along the y-axis. FIG. 7C illustrates the resulting diffraction pattern generated by the continuous or etched DOE 604 in response to incident light in both the first and second wavebands 710a, 710b.

The continuous or etched DOE configuration 604 illustrated in FIGS. 6 and 7A-7C may be utilized in either the narrow FOV optical detection system 100 shown in FIG. 1, wherein the DOE 104 would include the continuous or etched DOE configuration 604 or the wide FOV optical detection system 200 shown in FIG. 2.

Figure 8:
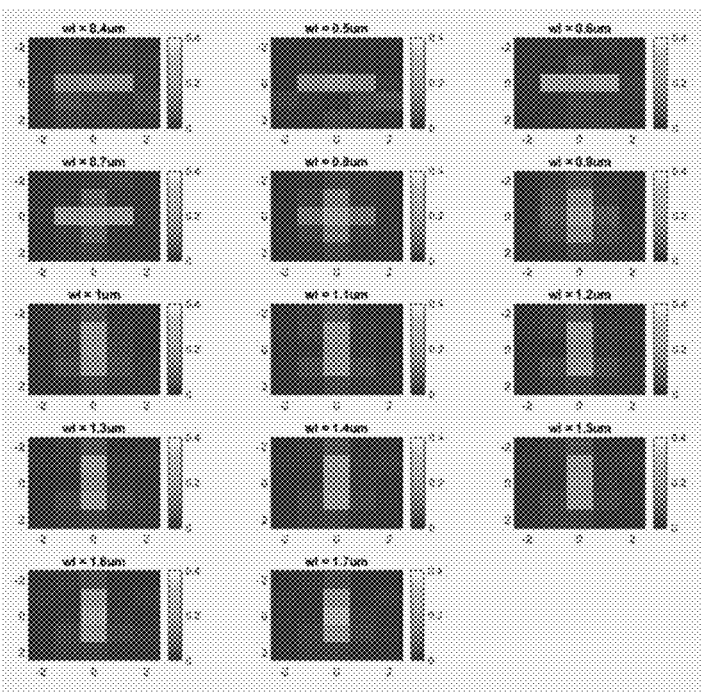
FIG. 8 includes a plurality of plots illustrating diffraction order patterns generated for a plurality of wavelengths of light utilizing an etched DOE according to some embodiments.

FIG. 8 includes a plurality of plots illustrating normalized diffraction order patterns generated for a plurality of wavelengths of light utilizing an etched DOE 604 according to some embodiments. In this embodiment, the continuous or etched DOE 604 is calculated and designed utilizing 16 levels or etch patterns. Test results are shown as a result of an angle of incidence of 0°. For wavelengths of 0.4 μm to 0.6 μm, the diffraction pattern generated is in the horizontal direction. As the wavelengths increase from 0.7 μm to 0.9 μm, a second diffractive pattern begins to emerge in the vertical direction (non-overlapping with the first pattern). As the wavelengths increase from 1 μm to 1.7 μm, the diffraction pattern generated is in the vertical direction. Similar performance would be provided by the stacked DOE configuration 304 and/or the tiled DOE configuration 404.

Figure 9:
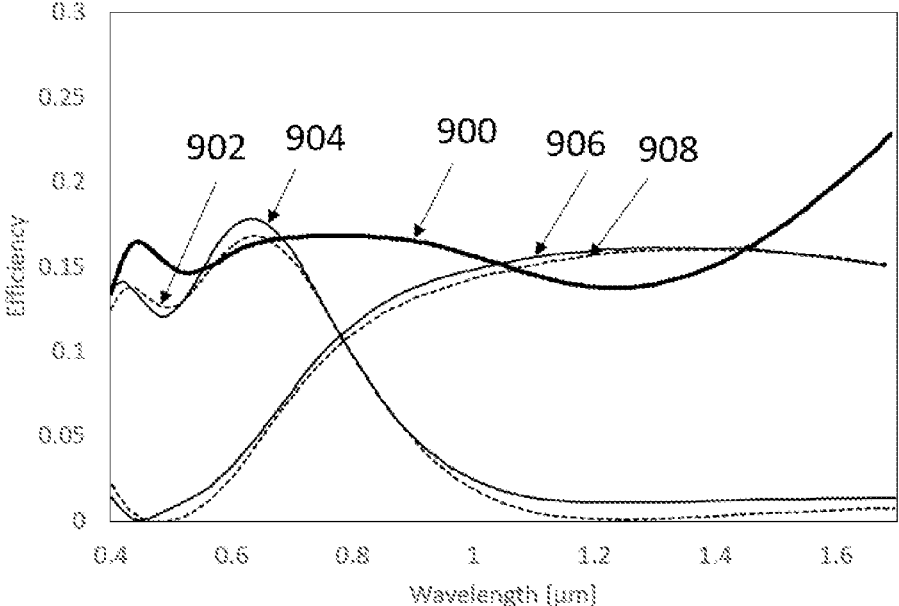
FIG. 9 is a graph plotting the efficiency of light diffracted into the zero and +/−1 order according to some embodiments.
Figure 13:
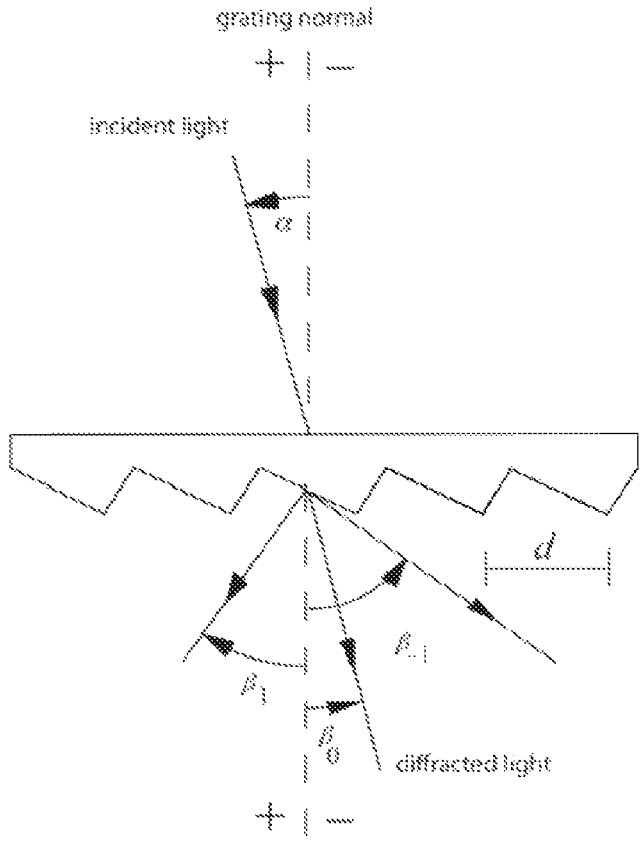
FIG. 13 is a diagram illustrating how incident light is diffracted by a grated diffractive element as known in the prior art.

FIG. 9 is a graph plotting the efficiency of light diffracted into the zero and +/−1 orders by the etched or continuous DOE 604 for a range of wavelengths shown along the x-axis according to some embodiments. The zero order efficiency is illustrated by the line 900, the +/−1 orders in the horizontal or x-direction are shown by lines 902 and 904, and the +/−1 orders in the vertical or y-direction are shown by lines 906 and 908. As desired, the continuous DOE 604 demonstrates good efficiency for the zero order across all wavelengths. The continuous DOE 604 demonstrates good efficiency of the +1/−1 orders in the horizontal direction for wavelengths between 0.4 μm to approximately 0.8 μm (as illustrated by lines 902, 904 being greater than 0.1 in efficiency), and good efficiency of the +1/−1 orders in the vertical direction for wavelengths between 0.8 m to approximately 1.6 μm (as illustrated by lines 906, 908 being greater than 0.1 in efficiency). Similar performance would be provided by the stacked DOE configuration 304 and/or the tiled DOE configuration 404.

FIGS. 10A-10E illustrates a plurality of diffraction patterns generated by the etched or continuous DOE 604 collimated lasers of various wavelengths of light according to some embodiments. FIG. 10A illustrates the optical response generated by the DOE 604 in response to laser light provided at 532 nm. The diffraction pattern is horizontal with clearly defined dots at the +1/−1 and 0 orders. FIG. 10B illustrates the optical response generated by the DOE 604 in response to laser light provided at 800 nm. At a frequency in between the optimized wavelengths, the diffraction pattern includes both vertical and horizontal components at the +1/−1 orders. In addition, the distance between the +1/−1 orders in the horizontal direction having increased spacing as compared with the diffraction pattern generated at 532 nm. These attributes allow the optical detection system to identify the wavelength of the incident wave. FIG. 10C illustrates the optical response generated by the DOE 604 in response to laser light provided at 1064 nm. The diffraction pattern is vertical with clearly defined dots at the +1/−1 and 0 orders. FIG. 10D illustrates the optical response generated by the DOE 604 in response to laser light provided at 1550 nm. The diffraction pattern is vertical with clearly defined dots at the +1/−1 and 0 orders. As compared with the diffraction pattern generated at 1064 nm, the vertical dots are spaced further apart in response to the incident light provided at 1550 nm. These attributes (e.g., direction and spacing of the dots produced) allow the system to detect and distinguish the wavelength of the incident light. FIG. 10E illustrates the diffraction pattern generated in response to incident light at 1550 nm that also includes heavy saturation. However, the +1/−1 diffraction orders are still more predominant and thus detectable.

FIG. 11A-11D illustrates a plurality of diffraction patterns generated by uncollimated lasers of various wavelengths of light according to some embodiments. In this embodiment, the DOE is designed such that the lower wavelengths (532 nm-800 nm) generate a vertical diffraction pattern and the high wavelengths (800 nm-1550 nm) generate a horizontal pattern. Also, FIGS. 11A-11D illustrate that the optical detection system can be utilized to detect wavelengths associated with uncollimated laser energy in addition to collimated laser energy (as shown in FIGS. 10A-10E). Once again, the diffraction patterns include +1/−1 orders in the vertical and horizontal directions based on wavelength, wherein the diffraction pattern spacing between the respective dots increases with increasing wavelength. The orientation and spacing of the resulting diffraction patterns is utilized to detect and distinguish between incoming laser light at a plurality of wavelengths (e.g., 400 nm-1550 nm).

FIGS. 12A and 12B are diffraction patterns of unsaturated and saturated collimated broadband energy collected according to some embodiments. FIG. 12A illustrates a diffraction pattern associated with unsaturated incoming light. FIG. 12B illustrates a diffraction pattern associated with saturated incoming light. In addition, FIGS. 12A and 12B illustrate the diffraction patterns resulting from incoming light having a wider linewidth than that illustrated in FIGS. 10A-10E and 11A-11D as indicated by the geometry of the dots included in the diffraction pattern. In some embodiments, more circular dots are indicative of incoming light having a narrower linewidth. More oval dots (as shown in FIGS. 12A and 12B) are indicative of incoming light having a wider linewidth. Lasers, defined by a relatively narrow linewidth, result in a pattern of well-defined circles (e.g., the type of dots shown in FIGS. 10A-10E and 11A-11D). As the linewidth of the incoming light increases, the dots making up the diffraction patterns become less defined (e.g., more oval shaped). In some embodiments, the geometry of the detected dots can be utilized to detect the linewidth of the incoming light and can be utilized to distinguish between lasers and other types of light.

Discussion of Possible Embodiments

The following are non-exclusive descriptions of possible embodiments of the present invention.

According to one aspect, an optical detection system includes a diffractive optical element (DOE) configured to receive incident light and a detector. The DOE causes incident light at a first wavelength to generate a first diffraction pattern and incident light at a second wavelength different than the first wavelength to generate a second diffraction pattern distinguishable from the first diffraction pattern, wherein the detector detects light diffracted by the DOE.

The optical detection system of the preceding paragraph may optionally include, additionally and/or alternatively, any one or more of the following features, configurations and/or additional components.

For example, in some aspects the first diffraction pattern and the second diffraction pattern may be non-overlapping.

In some aspects, the diffractive optical element may be comprised of a first diffractive grating that generates the first diffraction pattern and a second diffractive grating positioned in stacked arrangement with the first diffractive grating that generates the second diffraction pattern distinguishable from the first diffraction pattern.

In some aspects, the diffractive optical element may be comprised of a first plurality of diffraction tiles that generate the first diffraction pattern alternately arranged with a second plurality of diffraction tiles that generate the second diffraction pattern.

In some aspects, the first plurality of diffraction tiles and the second plurality of diffraction tiles may be arranged in a checkered configuration.

In some aspects, the diffractive optical element may include a plurality of identical cells that repeat along a surface of the diffractive optical element.

In some aspects, each cell of the plurality of identical cells may include a plurality of multi-binary levels.

In some aspects, the plurality of identical cells may approximate a continuous grating.

In some aspects, the continuous grating may be designed by simultaneously solving for a Fourier transform of two or more desired grating functions.

In some aspects, the optical detection system may include a lens system, wherein the diffractive optical element is included as part of the lens system.

In some aspects, the diffractive optical element may cause incident light at a third wavelength different than the first wavelength and the second wavelength to generate a third diffraction pattern distinguishable from the first diffraction pattern and the second diffraction pattern, wherein the third diffraction pattern is separated from the first and second diffraction patterns by a selected angle.

In some aspects, the optical detection system may further include a pupil located adjacent to the diffractive optical element, wherein diffracted light is provided to the pupil.

According to another aspect, a method of detecting and distinguishing light over a wide range of wavelengths includes receiving incident light at a diffractive optical element (DOE) that diffracts the incident light, wherein incident light at a first wavelength interacts with the DOE to generate a first diffraction pattern and incident light at a second wavelength interacts with the DOE to generate a second diffraction pattern distinguishable from the first diffraction pattern. The method further includes detecting at a focal plane array (FPA) light diffracted by the DOE.

The method of the preceding paragraph may optionally include, additionally and/or alternatively, any one or more of the following features, steps, configurations and/or additional components.

For example, in some aspects the first diffraction pattern and the second diffraction pattern may be non-overlapping.

In some aspects, the DOE may include a first diffractive grating that generates the first diffraction pattern and a second diffractive grating in stacked arrangement with the first diffractive grating that generates the second diffraction pattern distinguishable from the first diffraction pattern.

In some aspects, the DOE may comprise a first plurality of diffraction tiles that generate the first diffraction pattern alternately arranged with a second plurality of diffraction tiles that generate the second diffraction pattern.

In some aspects, the first plurality of diffraction tiles and the second plurality of diffraction tiles may be arranged in a checkered configuration.

In some aspects, the DOE may comprise a plurality of identical cells that repeat along a surface of the DOE.

In some aspects, each cell of the plurality of identical cells may include a plurality of multi-binary levels.

In some aspects, the plurality of identical cells may approximate a continuous grating.

In some aspects, the continuous grating may be designed by simultaneously solving for a Fourier transform of two or more desired grating functions.

In another aspect, a diffractive optical element includes a plurality of identical cells that repeat along a surface of the diffractive optical element to approximate a continuous grating, wherein each cell of the plurality of identical cells comprises a plurality of multi-binary levels, wherein the diffractive optical element causes incident light at a first wavelength to generate a first diffraction pattern and incident light at a second wavelength different than the first wavelength to generate a second diffraction pattern distinguishable from the first diffraction pattern.

The diffractive optical element of the preceding paragraph may optionally include, additionally and/or alternatively, any one or more of the following features, configurations and/or additional components.

For example, the continuous grating may be designed by simultaneously solving for a Fourier transform of two or more desired grating functions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An optical detection system comprising:
a diffractive optical element that causes incident light at a first wavelength to generate a first diffraction pattern defined by a first propagation vector, and causes incident light at a second wavelength different than the first wavelength to generate a second diffraction pattern defined by a second propagation vector, wherein the first propagation vector is non-parallel with the second propagation vector such that the first diffraction pattern is non-overlapping with the second diffraction pattern; and
a single detector configured to detect light diffracted by the diffractive optical element into the first diffraction pattern and the second diffraction pattern.

2. The optical detection system of claim 1, wherein the diffractive optical element comprises:
a first diffractive grating that generates the first diffraction pattern; and

12 a second diffractive grating in stacked arrangement with the first diffractive grating that generates the second diffraction pattern distinguishable from the first diffraction pattern.

3. The optical detection system of claim 1, wherein the diffractive optical element comprises a first plurality of diffraction tiles that generate the first diffraction pattern alternately arranged with a second plurality of diffraction tiles that generate the second diffraction pattern.

4. The optical detection system of claim 3, wherein the first plurality of diffraction tiles and the second plurality of diffraction tiles are arranged in a checkered configuration.

5. The optical detection system of claim 1, wherein the diffractive optical element comprises a plurality of identical cells that repeat along a surface of the diffractive optical element.

6. The optical detection system of claim 5, where each cell of the plurality of identical cells comprises a plurality of multi-binary levels.

7. The optical detection system of claim 5, wherein the plurality of identical cells approximate a continuous grating.

8. The optical detection system of claim 7, wherein the continuous grating is designed by simultaneously solving for a Fourier transform of two or more desired grating functions.

9. The optical detection system of claim 1, further including:
a lens system, wherein the diffractive optical element is included as part of the lens system.

10. The optical detection system of claim 1, wherein the diffractive optical element causes incident light at a third wavelength different than the first wavelength and the second wavelength to generate a third diffraction pattern distinguishable from the first diffraction pattern and the second diffraction pattern, wherein the third diffraction pattern is separated from the first and second diffraction patterns by a selected angle.

11. The optical detection system of claim 1, further including:
a pupil located adjacent to the diffractive optical element, wherein diffracted light is provided to the pupil.

12. A method of detecting and distinguishing light over a wide range of wavelengths, the method comprising:
receiving incident light at a diffractive optical element (DOE) that diffracts the incident light, wherein incident light at a first wavelength interacts with the DOE to generate a first diffraction pattern defined by a first propagation vector and incident light at a second wavelength interacts with the DOE to generate a second diffraction pattern defined by a second propagation vector, wherein the first propagation vector is non-parallel with the second propagation vector such that the first diffraction pattern is non-overlapping with the second diffraction pattern; and
detecting at a single focal plane array (FPA) light diffracted by the DOE.

13. The method of claim 12, wherein the DOE includes a first diffractive grating that generates the first diffraction pattern and a second diffractive grating in stacked arrangement with the first diffractive grating that generates the second diffraction pattern distinguishable from the first diffraction pattern.

14. The method of claim 12, wherein the DOE comprises a first plurality of diffraction tiles that generate the first diffraction pattern alternately arranged with a second plurality of diffraction tiles that generate the second diffraction pattern.

15. The method of claim 14, wherein the first plurality of diffraction tiles and the second plurality of diffraction tiles are arranged in a checkered configuration.

16. The method of claim 12, wherein the DOE comprises a plurality of identical cells that repeat along a surface of the DOE.

17. The method of claim 16, where each cell of the plurality of identical cells comprises a plurality of multi-binary levels.

18. The method of claim 17, wherein the plurality of identical cells approximate a continuous grating.

19. The method of claim 18, wherein the continuous grating is designed by simultaneously solving for a Fourier transform of two or more desired grating functions.

* * * * *